(12) United States Patent
Gioffre et al.

(10) Patent No.: US 7,520,467 B2
(45) Date of Patent: Apr. 21, 2009

(54) AIRCRAFT SENSOR POD ASSEMBLY

(75) Inventors: Charles Anthony Gioffre, Melborune, FL (US); James Patrick Healy, Melbourne, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 663 days.

(21) Appl. No.: 11/368,838

(22) Filed: Mar. 6, 2006

(65) Prior Publication Data

US 2007/0205327 A1 Sep. 6, 2007

(51) Int. Cl.
*H01Q 1/28* (2006.01)
(52) U.S. Cl. .................... 244/118.1; 343/872
(58) Field of Classification Search .............. 244/118.1, 244/121, 129.1, 130, 133, 137.4, 1 R; 343/872
See application file for complete search history.

(56) References Cited

U.S. PATENT DOCUMENTS

| | | | |
|---|---|---|---|
| 3,045,236 A | 7/1962 | Colman et al. .............. 343/707 |
| 4,057,104 A | 11/1977 | Atloz ........................... 165/35 |
| 4,509,709 A | 4/1985 | Utton et al. ................. 24/118.1 |
| 4,746,082 A | 5/1988 | Syms et al. ............... 244/137.4 |
| 5,049,891 A | 9/1991 | Ettinger et al. .............. 343/705 |
| 2005/0204910 A1* | 9/2005 | Padan ......................... 89/1.813 |
| 2005/0230527 A1* | 10/2005 | Silansky et al. ................ 244/30 |

* cited by examiner

*Primary Examiner*—Timothy D Collins
(74) *Attorney, Agent, or Firm*—Louis L. Dachs

(57) ABSTRACT

The invention is sensor pod assembly for mounting sensor systems for an aircraft, the aircraft having a fuselage with a longitudinal axis. In detail the sensor pod includes an elongated pod having front and rear ends, the pod removable mountable to the underside of the fuselage of the aircraft aligned with the longitudinal axis. A mounting system is includes to mount at least one container capable of being pressurized in a plurality of locations within the pod along the longitudinal axis, the at least one container including means to mount the sensor systems there within.

12 Claims, 5 Drawing Sheets

FIG. 1
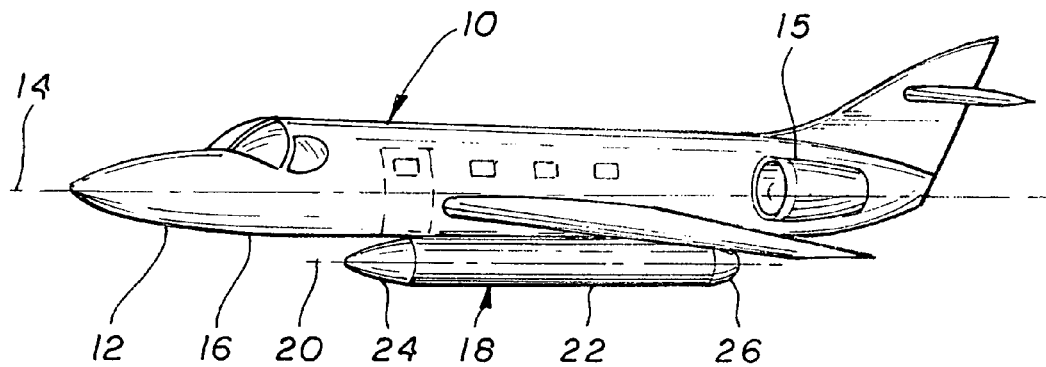
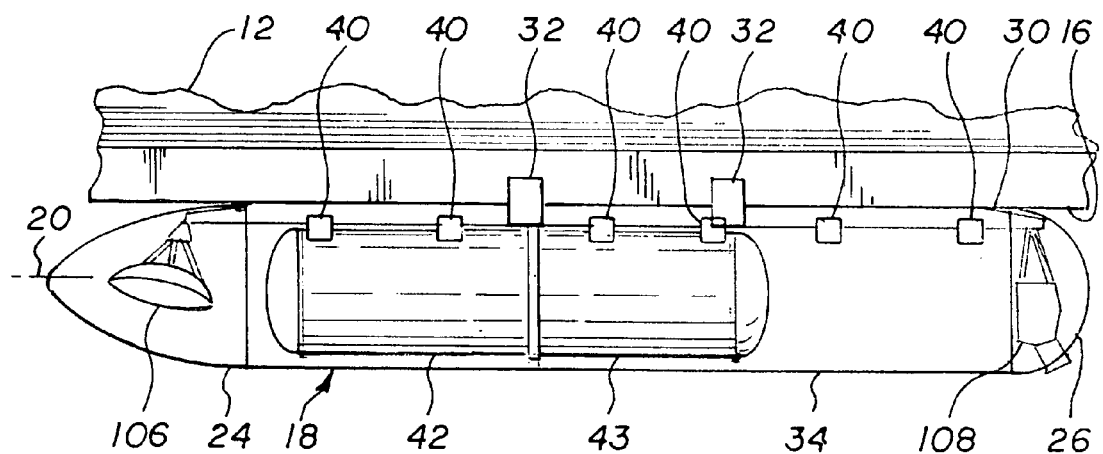
FIG. 2

AIRCRAFT SENSOR POD ASSEMBLY

BACKGROUND OF THE INVENTION

1. Field of the Invention

The invention relates to the field of aircraft and, in particular, to a sensor array pod mounted to the aircraft.

2. Description of Related Art

Mounting sensors such as radar antennas on aircraft has significant advantages. The most obvious advantage is that when the aircraft is at high altitude, a single aircraft can cover a large area. In addition, an aircraft can be flown to the area of interest. Circular shaped radomes have been mounted on aircraft as illustrated in U.S. Pat. No. 3,045,236 "Rotatable Radomes For Aircraft" by P. A. Colman, et al. and U.S. Pat. No. 5,049,891 "Radome-Antenna Installation With Rotating Equipment Rack" by J. J. Ettinger, et al. However, these circular shaped radomes are limited to radar systems where the radar antenna is continuously rotated. Thus the incorporation of other types of sensor systems is limited.

In U.S. Pat. No. 4,057,104 "Temperature Controlled Airborne Electronic Assembly" by F. E. Aloz discloses an elongated pod mounted on the vertical stabilizer. This location severely limits the size and weight of the equipment that can be incorporated therein because of its effect on the center of gravity of the aircraft. U.S. Pat. No. 4,509,709 "Swinging Pod Antenna Mount" by C. G. Utton, et al. discloses an elongated extendable antenna pod mounted on lower side of the fuselage. However, its location severely limits the antenna coverage. Furthermore, the use of a mechanism to extend and retract the pod adds weight to the aircraft, decreasing aircraft utility. Another example of a fuselage mounted pod is disclosed in U.S. Pat. No. 4,746,082 Aircraft and System Including Aircraft Borne Apparatus by P. W. Syms, et al. Here a sensor pod is suspended on the end of a pylon extending downward from the fuselage.

However, none of the prior art inventions disclose the use of a system to accommodate one or more pressurized instrument containers that can be located within the pod at various positions along the longitudinal axis of the pod. In addition, they do not disclose an assembly that can provide pressurization to the containers.

Thus, it is a primary object of the invention to provide a sensor pod for installation on an aircraft.

It is another primary object of the invention to provide a sensor pod for installation on an aircraft that optimizes sensor field of view.

It is a further object of the invention to provide a sensor pod for installation on an aircraft that improves center of gravity management.

It is a still further object of the invention to provide a sensor pod for installation on an aircraft that minimizes the impact to the stability and control of the aircraft.

It is another object of the invention to provide a sensor pod for installation on an aircraft that is adaptable to multiple sensors.

It is another object of the invention to provide a pod that can mount one or more pressurized instrument containers at various positions along the longitudinal axis of the pod.

SUMMARY OF THE INVENTION

The invention is a sensor pod assembly for mounting sensor systems for an aircraft, the aircraft having a fuselage with a longitudinal axis. The sensor pod includes an elongated pod having front and rear ends, the pod being removable mountable to the underside of the fuselage of the aircraft aligned with the longitudinal axis. An attachment system is incorporated to mount the at least one container capable of being pressurized in a plurality of locations within the pod along the longitudinal axis. The at least one container includes rack mounting structure for mounting sensor systems there within. The sensor pod assembly further includes a pressurization system for pressurizing the at least one container and a venting system for controlling the pressure level with in the at least one container.

In the case were there are two containers, the ends of the containers are adapted to accept band clamps with seals such that they can be joined together. Furthermore, mounting systems are provided for mounting additional sensors within the pod on either end of said at least one container.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 1 is a perspective view of an aircraft having the pod mounted thereon.

FIG. 2 is an enlarged side view of the pod shown in FIG. 1 partially broken away to show the interior thereof with two equipment containers mounted therein.

DESCRIPTION OF THE PREFERRED EMBODIMENT

Figure 3A:
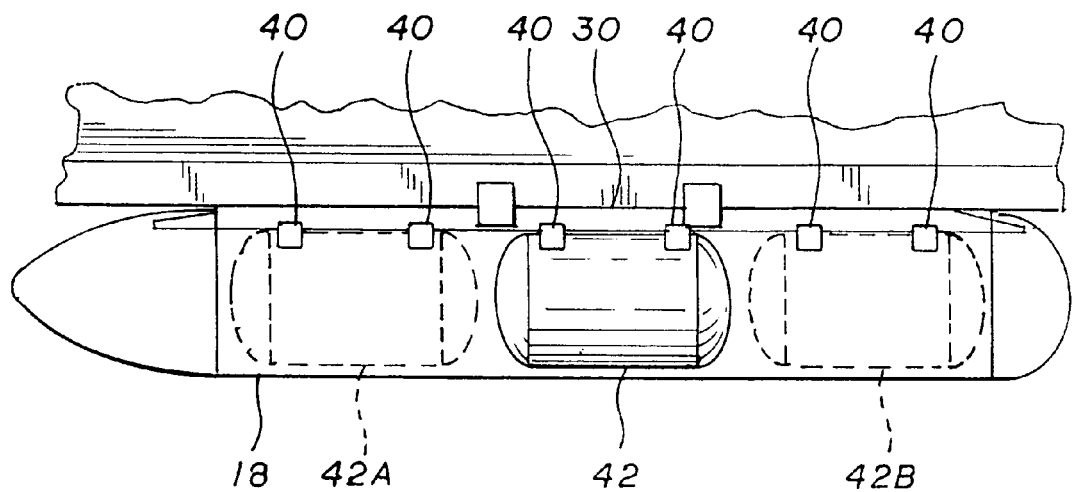
FIG. 3A is pictorial representation of the pod shown in FIG. 2 illustrating the installation of one or three containers within the pod.

Depicted in FIG. 1 is an aircraft, generally designated by numeral 10. The aircraft 10 includes a fuselage 12 having a longitudinal axis 14 and a propulsion system 15. Mounted on the bottom surface 16 of the fuselage 12 is an elongated (cigar shaped) sensor pod assembly 18. The sensor pod assembly 18, herein after referred to as the pod, has a longitudinal axis 20 aligned with the longitudinal axis 14 of the aircraft 10 and includes a center portion 22 front end portion 24 rear end portion 26, which are typically detachable.

Referring to FIG. 2, the pod 18 is includes a main support frame 30 which is attached to the bottom surface 16 of the fuselage 12 by fastener assemblies 32. The pod 18 includes an outer shell 34 that includes the front and rear portions 24 and 26 and is typically made of composite material that is transparent to radar transmissions. The frame 30 includes a plurality of attachment fittings 40 located along the longitudinal axis 20.

Figure 3B:
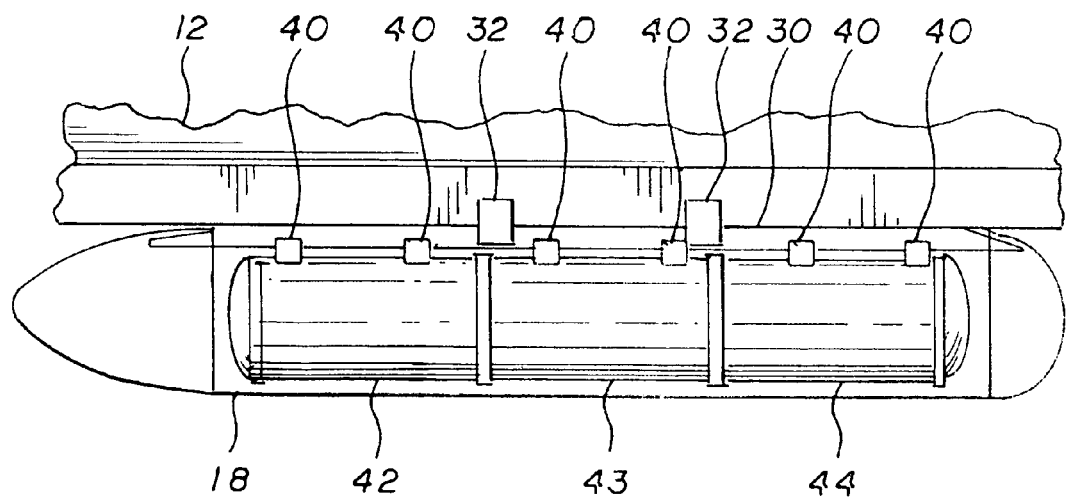
FIG. 3B is pictorial representation of the pod shown in FIG. 2 illustrating the installation of three containers within the pod.

Referring to FIGS. 3A and 3B, the pod 18 is adapted to receive a plurality of hollow cylindrical shaped equipment containers, as illustrated there are two, indicated by numerals 42, 43. In FIG. 3A a single container 42 is illustrated in various positions (42A and 42B) within the pod 18 and in FIG. 3B there is illustrated three containers 42, 43 and 44.

Figure 4:
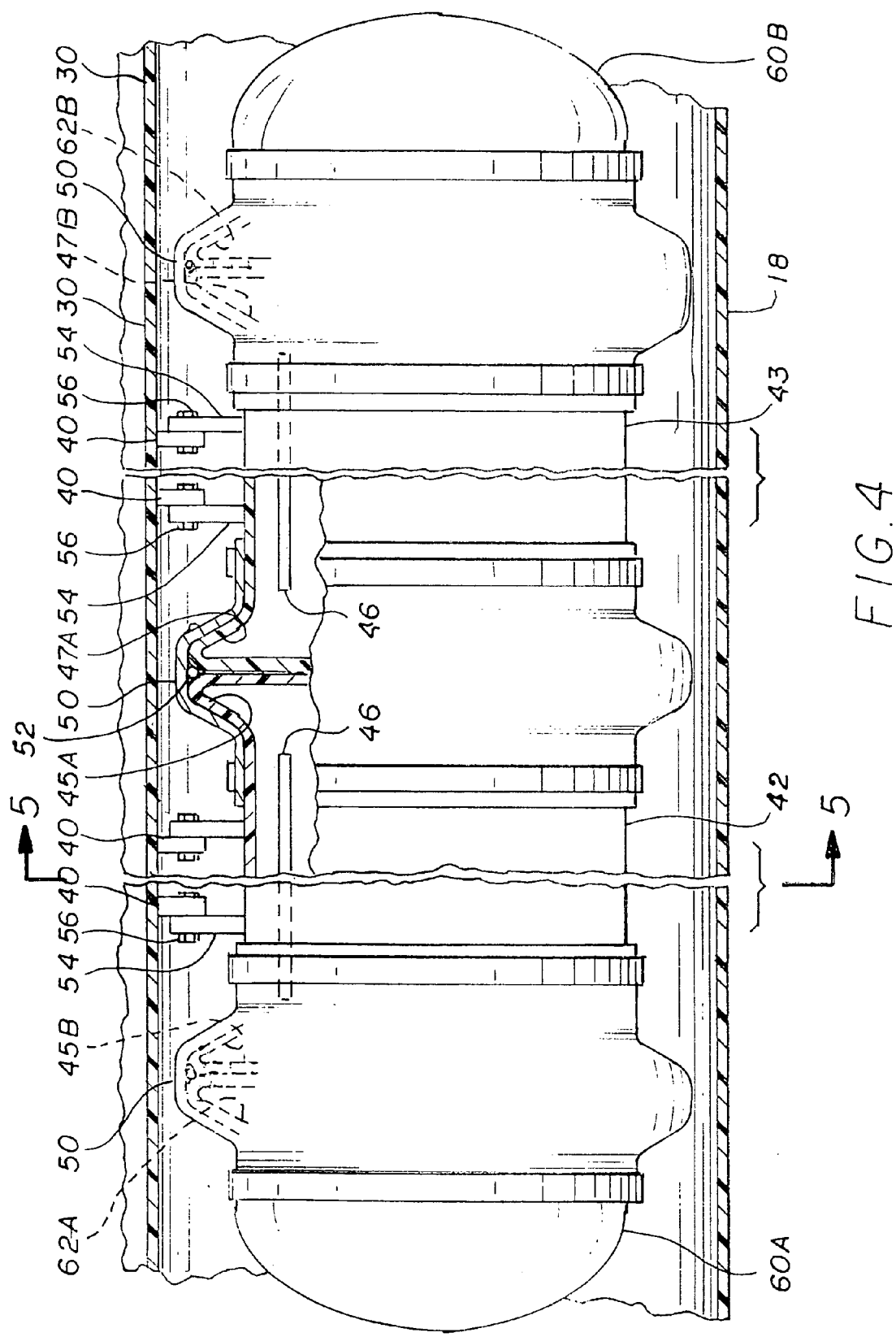
FIG. 4 is an enlarged view of a portion of FIG. 2.
Figures 5, 6:
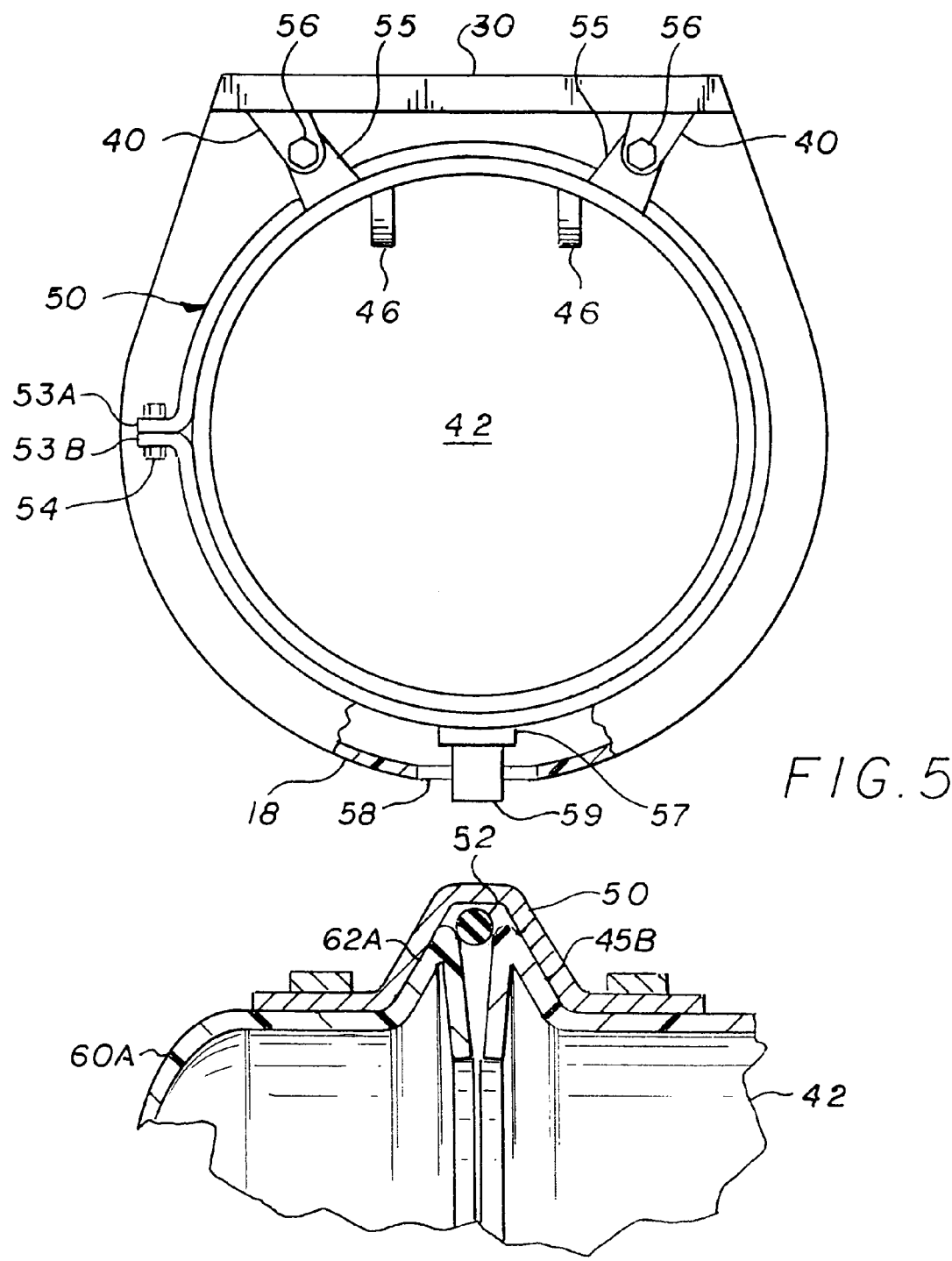
FIG. 5 is a cross-sectional view of FIG. 2 taken along the line 5-5 illustrating the mounting of the containers with in the pod.
FIG. 6 is an enlarged partial cross-sectional view of FIG. 4 illustrating the V band coupling used to secure containers together.

Referring back to FIG. 2 and additionally to FIGS. 4-6, container, 42 and includes first and second flanged ends 45A and 45B and incorporates at least one standard EIA equipment rack 46. Container 43 includes first and second flanged ends 47A and 47B and also incorporates an equipment rack 46

The flanged ends 45A and 47A are adapted to receive standard band clamps 50 incorporating a seal 52. Thus, as illustrated, flanged end 45A of container 42 can be secured to end 47A of container 43 by clamp 50. The ban clamps 50 have flanged ends 53A and 53B and are secured together by fastener 54. Each container 42, 43 and 44 incorporate attachment flanges 55 fro securing to attachment fittings 40 on the frame 30 by means of fastener assemblies 56. The container 42 may include a mounting plate 57 for attaching an electronic device such as an antenna 58 that would extend out of a aperture 59 in the pod 18.

Ends 45B of container 42 and end 47B of container 43 are sealed off by end caps 60A and 60B, both having mating inverted V shaped flanges 62A and 62B, clamped by band clamps 50 with seal 52. Thus it can be seen that the two containers 42 and 43 when joined together in such a manner as to form a single structure capable of being pressurized. Again, it should be noted that the number of containers and their placement can be varied.

Figure 7:
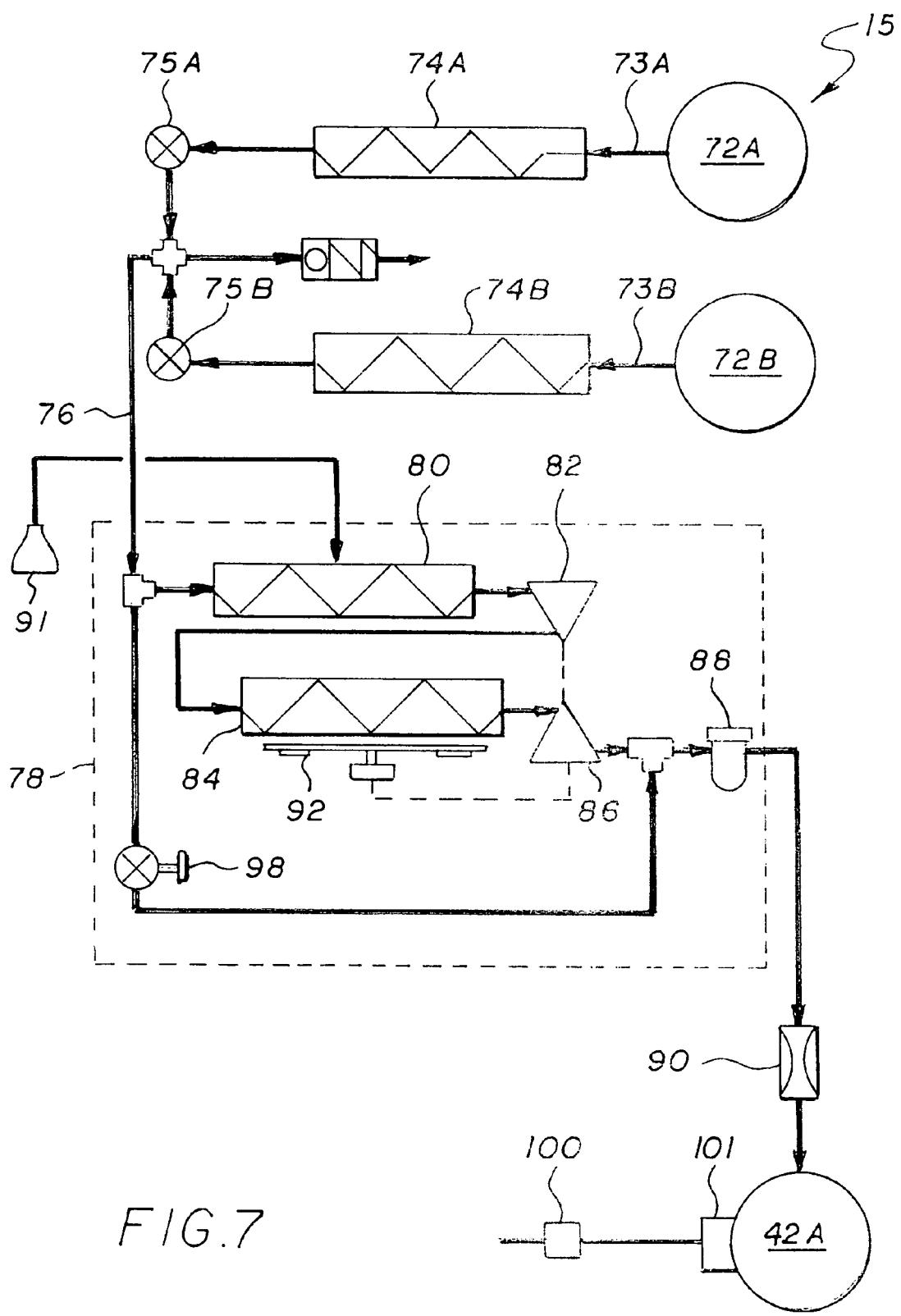
FIG. 7 is a schematic of the pressurization and temperature control system for the containers.

Pressurization is typically accomplished by using propulsion system 15 bleed air. Referring to FIG. 7, the propulsion system 15 includes to turbojet engines 72A and 72B. Bleed air from the engines is fed into lines 73A and 73B passed through heat exchangers 74A and 74B, flow and shutoff valves 75A and 75B and mixed together. The mixed flow is passed via line 76 to a conventional air cycle machine 78. The air from line 76 passes through a pre-cooler 80 and into a compressor 82 passes out through an intercooler 84 to a turbine 86 which drives the compressor 82. The air then passes through a water separator 88 a chow-flow device 90 and into the containers. The pre-cooler 80 is cooled by ram air through ram air inlet 91, while the intercooler is cooled by a fan 92 driven by the turbine 86. Additionally, a by pass valve 98 is incorporated in line 76 that can be pass air around the compressor and turbine and coupled directly to the water separator 88. Thus as previously mentioned, the pressurization system is a conventional design. The container incorporates and out flow valve 100. In addition, a pressure switch 101 is provided that will activate a discharge valve should pressure rise above a pre-set value.

Additionally, referring back to FIG. 2 a radar system 106 can be installed in the front portion 24 and a optical recording system 108 can be installed in the rear portion 26 of the pod. These components do not normally require conditioned air.

Thus it can be seen that pod assembly can accommodate a varying number of pressurized containers at various location along the longitudinal axis thereof. These containers are adapted to receive conditioned air; In addition, the containers incorporate equipment racks that can handle a wide variety of electronic components.

While the invention has been described with reference to a particular embodiment, it should be understood that the embodiments are merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft industry.

The invention claimed is:

1. A sensor pod assembly for mounting sensor systems for an aircraft, the aircraft having a fuselage with a longitudinal axis, the sensor pod comprising;
   an elongated pod having front and rear ends, said pod removable mountable to the underside of the fuselage of the aircraft aligned with the longitudinal axis; and
   means mounting at least one container capable of being pressurized in a plurality of locations within the pod along the longitudinal axis, said at least one container including means to mount the sensor systems there within.

2. The sensor pod assembly as set forth in claim 1 including means to pressurize said at least one container.

3. The sensor pod assembly as set forth in claim 2 wherein said means to pressurize said at least one container includes means to control the pressure level within said at least one container.

4. The sensor pod assembly as set forth in claim 1, or 2 or 3 comprising means to mount additional sensors within said pod on either end of said at least one container.

5. The sensor pod assembly as set forth in claim 4 where in there are at least first and second containers, each having first and second ends, said first ends of said at least first and second containers joined together.

6. The sensor pod assembly as set forth in claim 5 wherein said pod includes first and second ends, at least one of said first and second ends of said pod made of material transparent to radar signals.

7. An aircraft comprising:
   a fuselage portion having a longitudinal axis; and
   a sensor pod comprising;
      an elongated pod having front and rear ends, said pod removable mountable to the underside of the fuselage of the aircraft aligned with the longitudinal axis; and
      means mounting at least one container capable of being pressurized in a plurality of locations within the pod along the longitudinal axis, said at least one container including means to mount the sensor systems there within.

8. The aircraft set forth in claim 7 including means to pressurize said at least on container.

9. The aircraft as set forth in claim 8 wherein said means to pressurize said at least one container includes means to control the pressure level within said at least one container.

10. The aircraft as set forth in claim 7 or 8 or 9 comprising means to mount additional sensors within said pod on either end of said at least one container.

11. The aircraft as set forth in claim 10 where in there are at least first and second containers, each having first and second ends, said first ends of said at least first and second containers joined together.

12. The aircraft as set forth in claim 11 wherein said pod includes first and second ends, at least one of said first and second ends of said pod made of material transparent to radar signals.

* * * * *